(12) United States Patent
Ahuja et al.

(10) Patent No.: US 9,651,186 B2
(45) Date of Patent: May 16, 2017

(54) AXIAL FLOW CONDITIONING DEVICE FOR MITIGATING INSTABILITIES

(71) Applicant: Combustion Research and Flow Technology, Inc., Pipersville, PA (US)

(72) Inventors: Vineet Ahuja, Fort Washington, PA (US); Roger M. Birkbeck, Newtown, PA (US); Ashvin Hosangadi, Jamison, PA (US)

(73) Assignee: Combustion Research and Flow Technology, Inc., Pipersville, PA (US)

( * ) Notice: Subject to any disclaimer, the term of this patent is extended or adjusted under 35 U.S.C. 154(b) by 0 days.

(21) Appl. No.: 14/774,950

(22) PCT Filed: Nov. 19, 2014

(86) PCT No.: PCT/US2014/066314
§ 371 (c)(1),
(2) Date: Sep. 11, 2015

(87) PCT Pub. No.: WO2016/080976
PCT Pub. Date: May 26, 2016

(65) Prior Publication Data
US 2016/0153602 A1   Jun. 2, 2016

(51) Int. Cl.
*F16L 55/07* (2006.01)
*F16L 55/04* (2006.01)
(Continued)

(52) U.S. Cl.
CPC .............. *F16L 55/04* (2013.01); *F15D 1/025* (2013.01); *F16L 55/02736* (2013.01); *F16L 55/02754* (2013.01)

(58) Field of Classification Search
USPC ......................................... 138/42, 43, 44, 45
See application file for complete search history.

(56) References Cited

U.S. PATENT DOCUMENTS 1,648,708 A  *  11/1927  Wilkinson ................ G01F 1/40
                                                    138/40
1,776,192 A  *  9/1930  Perry ....................... F02M 1/00
                                                    261/53

(Continued)

OTHER PUBLICATIONS

Miller, H. L., Heavy Duty Control Valves, 2000, pp. 1-7., CCI, Rancho Santa Margarita, CA.

*Primary Examiner* — James Hook
(74) *Attorney, Agent, or Firm* — Michael Crilly, Esquire

(57) ABSTRACT

A flow conditioning device for incrementally stepping down pressure within a piping system is presented. The invention includes an outer annular housing, a center element, and at least one intermediate annular element. The outer annular housing includes an inlet end attachable to an inlet pipe and an outlet end attachable to an outlet pipe. The outer annular housing and the intermediate annular element(s) are concentrically disposed about the center element. The intermediate annular element(s) separates an axial flow within the outer annular housing into at least two axial flow paths. Each axial flow path includes at least two annular extensions that alternately and locally direct the axial flow radially outward and inward or radially inward and outward thereby inducing a pressure loss or a pressure gradient within the axial flow. The pressure within the axial flow paths is lower than the pressure at the inlet end and greater than the vapor pressure for the axial flow. The invention minimizes fluidic instabilities, pressure pulses, vortex formation and shedding, and/or cavitation during pressure step down to yield a stabilized flow within a piping system.

22 Claims, 9 Drawing Sheets

(51) Int. Cl.
    *F16L 55/027*     (2006.01)
    *F15D 1/02*     (2006.01)

(56) References Cited

U.S. PATENT DOCUMENTS

| | | | |
|---|---|---|---|
| 1,983,255 A * | 12/1934 | Wahlmark | F02M 9/1275 |
| | | | 261/121.3 |
| 2,400,161 A | 5/1946 | Mockridge et al. | |
| 2,568,084 A | 9/1951 | Mockridge | |
| 3,078,877 A | 2/1963 | Leeper | |
| 3,152,617 A * | 10/1964 | Justus | F16K 25/04 |
| | | | 137/625.5 |
| 3,692,064 A | 9/1972 | Hohnerlein et al. | |
| 3,894,562 A | 7/1975 | Moseley, Jr. et al. | |
| 4,043,360 A | 8/1977 | Yaron | |
| 4,299,655 A * | 11/1981 | Skaugen | B01F 5/0413 |
| | | | 162/343 |
| 4,387,685 A * | 6/1983 | Abbey | F02D 35/0076 |
| | | | 123/439 |
| 5,390,896 A | 2/1995 | Smirl | |
| 5,527,433 A * | 6/1996 | Begemann | F15D 1/02 |
| | | | 138/43 |
| 5,535,175 A * | 7/1996 | Niimi | B01F 5/0656 |
| | | | 138/42 |
| 5,758,689 A | 6/1998 | Leinen | |
| 6,161,584 A | 12/2000 | Hemme et al. | |
| 7,051,765 B1 | 5/2006 | Kelley et al. | |
| 7,156,122 B2 | 1/2007 | Christenson et al. | |
| 7,455,115 B2 * | 11/2008 | Loretz | E21B 43/12 |
| | | | 138/43 |
| 7,708,453 B2 * | 5/2010 | Kozyuk | B01F 5/0665 |
| | | | 138/42 |
| 7,866,345 B2 | 1/2011 | Lowery | |
| 8,132,961 B1 * | 3/2012 | England | B01F 5/0428 |
| | | | 366/340 |
| 8,312,931 B2 | 11/2012 | Xu et al. | |
| 8,646,535 B2 | 2/2014 | Xu et al. | |
| 2004/0255660 A1 * | 12/2004 | Abdolhosseini | F02M 33/00 |
| | | | 73/114.32 |
| 2005/0045239 A1 | 3/2005 | Krieger et al. | |
| 2010/0084034 A1 * | 4/2010 | Sonnenberg | F15D 1/001 |
| | | | 138/39 |

* cited by examiner

AXIAL FLOW CONDITIONING DEVICE FOR MITIGATING INSTABILITIES

FEDERALLY SPONSORED RESEARCH AND DEVELOPMENT

One or more of the inventions disclosed herein were supported, at least in part, by a grant from the National Aeronautics and Space Administration (NASA) under Contract No. NNX12CB10C awarded by NASA, Stennis Space Center. The United States Government may have certain limited rights to at least one form of the invention(s).

CROSS REFERENCE TO RELATED APPLICATIONS

This application is based upon and claims priority from Patent Cooperation Treaty Application No. PCT/US2014/066314 filed Nov. 19, 2014 entitled Axial Flow Conditioning Device for Mitigating Instabilities. The subject matter of the prior application is incorporated in its entirety herein by reference thereto.

BACKGROUND OF THE INVENTION

1. Field of the Invention

The invention generally relates to a flow conditioning device and more particularly is concerned, for example, with an axial-orifice type element that steps down the pressure within an axially flowing liquid regime. Specifically, the invention suppresses noise and instabilities caused by pressure fluctuations, vortex shedding, and cavitation that typically result when the pressure within an axial flow is reduced. The invention employs viscous dissipation to step down pressure within an axial flow, straightens an axial flow, and damps out free-stream instabilities within an axial flow. The invention produces a stable axial flow devoid of pressure and velocity fluctuations.

2. Background

A single-hole orifice 1, as shown in FIG. 1, is commonly used to meter flow, to damp acoustic resonances, or to reduce pressure over a small axial distance in a piping system. A single-hole orifice 1 typically includes a cylindrical outer wall 2. A plate 3 is attached to the interior surface of the outer wall 2 so as to completely traverse the flow path formed by the outer wall 2 thereby defining an upstream side 6 and a downstream side 7. The plate 3 includes a hole 4 that restricts flow of a fluid 5 from the upstream side 6 to the downstream side 7.

The performance of a single-hole orifice 1 is typically characterized by the average discharge coefficient representative of the ratio of the measured and theoretical volumetric or mass flow rates. The device is sized for use within a system based on the Reynolds Number of the flow, mass or volumetric flow rate, and the required pressure drop.

FIGS. 2a and 2b illustrate the pressure and velocity across a single-hole orifice 1, respectively. The pressure of the fluid 5 drops significantly from $P_1$ to $P_{throat}$ and the velocity of the fluid 5 increases from $V_1$ to $V_{throat}$ as a result of flow acceleration within the constriction of the orifice. The pressure recovers from $P_{throat}$ to $P_2$ after the fluid 5 exits the constriction; however, $P_2$ is lower than $P_1$ because of losses due to flow resistance, frictional losses, and flow turning.

As seen in FIG. 1, hydrodynamic instabilities are formed when the fluid 5 traverses the hole 4 creating a vortex 8 attached to the plate 3 at the downstream side 7. The vortex 8 periodically detaches from the plate 3 in a process referred to as vortex shedding. The plate 3 introduces large shearing stresses into the fluid 5 during flow acceleration as the fluid 5 negotiates the hole 4. Shear is responsible at least in part for the periodic shedding of vortices. The flow acceleration results in a lower pressure within the fluid 5 through the plate 3. In some cases, the pressure can fall below the vapor pressure resulting in a vapor cavity or cavitation 9, as represented in FIG. 2a with the corresponding velocity increase in FIG. 2b. In other cases, the pressure in the vortex cores falls below the vapor pressure resulting in the generation of bubbles.

Pressure fluctuations from both the cavitation and the vortex shedding are amplified if the frequency is sufficiently similar to the natural frequency within the piping system. Sometimes it is possible for a single-hole orifice 1 to operate in a "choked flow" condition during high mass flow rates so that the pressure drop causes large vapor cavities to form. Flow transients in a piping system can disrupt the vapor cavities causing shedding and convection of vapor clouds in the downstream section of the piping system. The local temperature gradients and pressure recovery downstream can cause the clouds to condense producing violent high amplitude pressure spikes that damage the piping system. For some single-hole orifices 1, an unstable feedback loop can form between vortex shedding and acoustic perturbations originating from upstream components resulting in an amplification of the modes that convect downstream.

A single-hole orifice 1 is usually one component within a multiple component piping system that could include, but is not limited to, valves, pumps, turning ducts, and diffusers. As such, a single-hole orifice 1 rarely operates under nominally "steady" conditions and therefore is subject to pressure and/or velocity fluctuations. Even during non-cavitation conditions, small perturbations in the upstream side 6 elicit a highly complex non-linear dynamic response from a single-hole orifice 1 resulting in large scale fluctuations that are convected downstream.

At least one source postulates that a mode conversion takes place in acoustically-modulated, confined jets through an orifice resulting in a feedback instability. Another source reports that the overall response of an orifice is bounded by the response predicted by the one-dimensional linearized theory, the exception being a local resonance condition when the driving frequency is close to the natural frequency of the Kelvin Helmholtz instability in the orifice. Regardless, instability modes, either initiated or amplified, can have a profound effect on the operation of components downstream from a single-hole orifice. Various attempts have been made to inhibit and to control the hydrodynamic instabilities associated with a single-hole orifice.

In one example, a globe-style control valve with anti-cavitation trims was substituted for an orifice within a piping system including an orifice and a control valve. The globe-style control valve provided the functionality of an orifice and operated in choked flow much like an orifice. This approach reduced the extent of cavitation within the piping system; however, the globe-style control valve did little to reduce vibrations within the system. Furthermore, cavitation in the globe-style control valve eroded the valve trims increasing the risk of significant damage to the piping system over time.

In another example, a two-stage orifice was implemented to operate in conjunction with throttle valves within an emergency cooling and containment system applicable to the downstream section of a pressurized water reactor. A first stage caused fluid to flow through tangential slots while a second stage caused fluid to flow both axially and tangentially. The two-stage orifice achieved the resistance of a single-stage orifice without the cavitation of the latter. However, the tangential flow inherent to the two-stage orifice caused significant swirl in the downstream fluid that accelerated erosion of the piping system. Furthermore, the additional stage increased the overall length of the orifice such that the device was incompatible with many applications.

As is readily apparent from the discussions above, the related arts do not provide a device that minimizes the instability modes associated with pressure step-down functionality. In particular, the related arts do not describe a device that avoids vortex shedding and cavitation. As such, the related arts are prone to vibrational responses that compromise the structural integrity of a piping system and to flow conditions that erode downstream components within a piping system.

Accordingly, what is required is a flow conditioning device that achieves the resistance required for a particular pressure drop within an axially efficient design envelope.

Accordingly, what is also required is a flow conditioning device that suppresses the instabilities, namely, vortex shedding and cavitation, associated with the reduction of pressure within an axial flow.

Accordingly, what is also required is a flow conditioning device that minimizes pressure fluctuations in a downstream flow.

Accordingly, what is also required is a flow conditioning device that minimizes vibrations communicable to a piping system.

Accordingly, what is also required is a flow conditioning device that provides flow resistance or pressure drop while minimizing the risk of cavitation in cryogenic and volatile liquids with vapor pressures higher than conventional liquids, one non-limiting example of the latter being water.

SUMMARY OF THE INVENTION

An object of the invention is to provide a flow conditioning device that achieves the resistance required for a specified pressure drop within an axially efficient design envelope.

An object of the invention is to provide a flow conditioning device that suppresses the instabilities, namely, vortex shedding and cavitation, associated with the reduction of pressure within an axial flow.

An object of the invention is to provide a flow conditioning device that minimizes pressure fluctuations in a downstream flow.

An object of the invention is to provide a flow conditioning device that minimizes vibrations communicable to a piping system.

An object of the invention is to provide a flow conditioning device that provides flow resistance or pressure drop while minimizing the risk of cavitation in cryogenic and volatile liquids with vapor pressures higher than conventional liquids, one non-limiting example of the latter being water.

In accordance with embodiments of the invention, a flow conditioning device for stepping down a pressure within an axial flow within a piping system while minimizing pressure fluctuations, vortex formation, and cavitation includes an outer annular housing, a center element, and at least one intermediate annular element. The outer annular housing includes an inlet end attachable to an inlet pipe and an outlet end attachable to an outlet pipe. The outer annular housing and intermediate annular element(s) are concentrically disposed about the center element. The intermediate annular element(s) separates the axial flow within the outer annular housing into at least two axial flow paths. Each axial flow path has an annular cross section. Each axial flow path includes at least two annular extensions that alternately direct the axial flow radially outward and inward or radially inward and outward thereby reducing the pressure as the axial flow traverses the axial flow paths so that the pressure at the outlet end is lower than the pressure at the inlet end. Also, the pressure within the axial flow along each axial flow path is greater than a vapor pressure for the axial flow.

In accordance with other embodiments of the invention, each axial flow path is defined by an inner annular surface and an outer annular surface. Each inner annular surface includes at least one annular extension directed toward the center element. Each outer annular surface includes at least one annular extension directed toward the outer annular housing. The annular extensions are arranged so that one annular extension disposed outward is immediately adjacent to another annular extension disposed inward.

In accordance with other embodiments of the invention, the annular extensions are defined by an undulated surface along each of the inner annular surface and the outer annular surface. The undulated surfaces minimize viscous drag and resistance encountered by the axial flow along each axial flow path.

In accordance with other embodiments of the invention, the height of the axial flow path is constant along the length of the axial flow path.

In accordance with other embodiments of the invention, the height of the axial flow path varies along the length of the axial flow path.

In accordance with other embodiments of the invention, a pair of extension tubes are separately attached to the inlet end and the outlet end. Each extension tube includes threads facilitating attachment to one of the inlet pipe and the outlet pipe.

In accordance with other embodiments of the invention, a pair of extension tubes are separately attached to the inlet end and the outlet end. Each extension tube includes a flange facilitating attachment to one of the inlet pipe and the outlet pipe.

In accordance with other embodiments of the invention, an end cap is attached to the inlet end. The end cap includes an outer ring that contacts the outer annular housing, at least one inner ring that separately contacts the intermediate annular element(s), and a hub that contacts the center element. The end cap directs the axial flow into the axial flow paths.

In accordance with other embodiments of the invention, a first portion and a second portion of the annular extension are disposed about at least one other annular extension.

In accordance with other embodiments of the invention, the flow condition device defines a module. At least two modules are attached in an end-to-end arrangement.

In accordance with embodiments of the invention, the flow conditioning method for stepping down a pressure within an axial flow via a flow conditioning device within a piping system while minimizing pressure fluctuations, vortex formation, and cavitation includes the steps of receiving, separating, directing, and communicating an axial flow. In the receiving step, the axial flow from the piping system is received into the flow conditioning device that includes an outer annular housing with a center element therein. In the separating step, the axial flow is separated into at least two axial flow paths via at least one intermediate annular element disposed between the outer annular housing and the center element. In the directing step, the axial flow is directed radially outward and inward or radially inward and outward within each axial flow path so as to reduce the pressure as the axial flow traverses the flow conditioning device. In the communicating step, the axial flow from the flow conditioning device is communicated into the piping system after the directing step. The pressure within the axial flow after the directing step is lower than the pressure before the directing step. The pressure within the axial flow during and after the directing step is greater than a vapor pressure for the axial flow.

In accordance with other embodiments of the invention, the directing step is implemented by at least two annular extensions along each axial flow path.

In accordance with other embodiments of the invention, the annular extensions are defined by an undulated surface. The undulated surfaces minimize viscous drag and resistance encountered by the axial flow along each axial flow path.

In accordance with other embodiments of the invention, a first portion and a second portion of one annular extension are disposed about at least one other annular extension.

In accordance with other embodiments of the invention, the separating step is further implemented by an end cap. The end cap includes an outer ring that contacts the outer annular housing, at least one inner ring that separately contacts the intermediate annular element(s), and a hub that contacts the center element.

In accordance with other embodiments of the invention, the directing step is implemented via at least two modules attached in an end-to-end configuration. At least one module directs the axial flow radially outward and inward or at least one module directs the axial flow radially inward and outward.

In accordance with other embodiments of the invention, the pressure at the inlet end and the pressure at the outlet end of one module define a pressure drop for the module whereby the pressure drops are identical between two adjacent modules.

In accordance with other embodiments of the invention, the pressure at the inlet end and the pressure at the outlet end of one module define a pressure drop for the module whereby the pressure drops differ between two adjacent modules.

A single-hole orifice element reduces pressure by increasing velocity. In contrast, the invention nearly linearly steps down the pressure within a flow by dissipating the energy within the flow, straightening the flow, and damping out free-stream instabilities within the flow. These features enable the invention to suppress the instability modes common to single-hole orifices while providing the requisite resistance to effectively reduce the pressure within a flow.

The invention suppresses both the hydrodynamic instability mode and the cavitation instability mode that are commonly observed during operation with a conventional single-hole orifice. The invention includes two or more concentrically disposed elements, each having annular extensions that create a flow path resistant to the flow. The shape of the annular extensions, number of concentric channels, and length of the invention alter the resistance to flow and consequently, the pressure gradient achievable by the invention.

The orientation of the annular extensions is critical to performance. Annular extensions oriented perpendicular to the inlet flow form a path with high resistance and large pressure losses Annular extensions oriented at an angle to the inlet flow create a more aerodynamic flow path with less viscous drag and less resistance to flow.

The number of concentric channels influences the resistance provided by the invention. In general, the total interior surface area of the invention in contact with a fluid is directly related to the number of concentric channels. It was observed in some designs that a reduction in the number of channels often resulted in larger but less grooves when the device length was fixed. It was also observed in other designs that a reduction in the number of concentric channels from four to three caused a one-half reduction in the pressure gradient by the invention.

The length of the invention also influences the resistance achievable thereby. The total interior surface area of the invention in contact with a fluid is directly related to the axial length of the invention. In general, the length of the invention and the resistance or pressure drop are linearly related when the grooves are of fixed design and disposed along each channel in a repeating arrangement. This feature allows the invention to be constructed in a modular, scalable form permitting the user to assemble two or more modules to form a single flow control device.

Several advantages are offered by the invention. The invention mitigates development of instabilities such as vortex shedding and cavitation. The invention minimizes pressure fluctuation at the outlet end thereof over a wide range of inlet pressure conditions including pressures representative of a saturation condition. The invention avoids pressures below the vapor pressure of the fluid thereby preventing cavitation or phase change within a downstream flow. The invention minimizes vibrations communicable to piping systems. The invention facilitates modular construction for customizable solutions based on the pressure drop required. The invention employs axial viscous mechanisms to dissipate energy, thus avoiding erosion-prone swirl flow within a downstream section of a piping system. The design is applicable to a variety of fluids including, but not limited to, liquids, one non-limiting example being water, and cryogenically-cooled liquids, one non-limiting example being liquid nitrogen.

The above and other objectives, features, and advantages of the preferred embodiments of the invention will become apparent from the following description read in connection with the accompanying drawings, in which like reference numerals designate the same or similar elements.

BRIEF DESCRIPTION OF THE DRAWINGS

Additional aspects, features, and advantages of the invention will be understood and will become more readily apparent when the invention is considered in the light of the following description made in conjunction with the accompanying drawings.

DETAILED DESCRIPTION OF THE INVENTION

Figure 1:
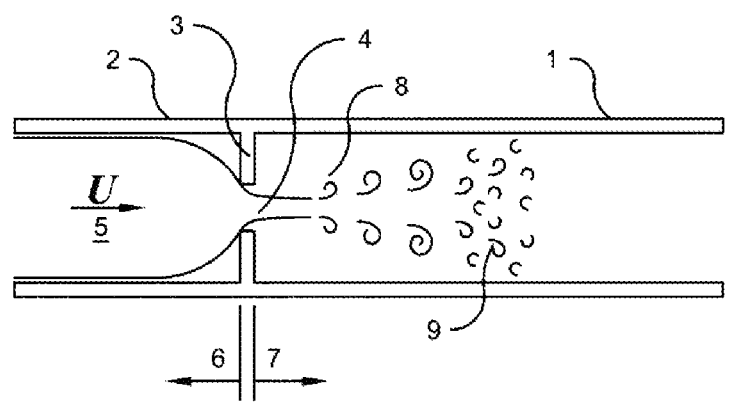
FIG. 1 is a cross section view illustrating upstream and downstream flow within an exemplary single-hole orifice.
Figure 2A:
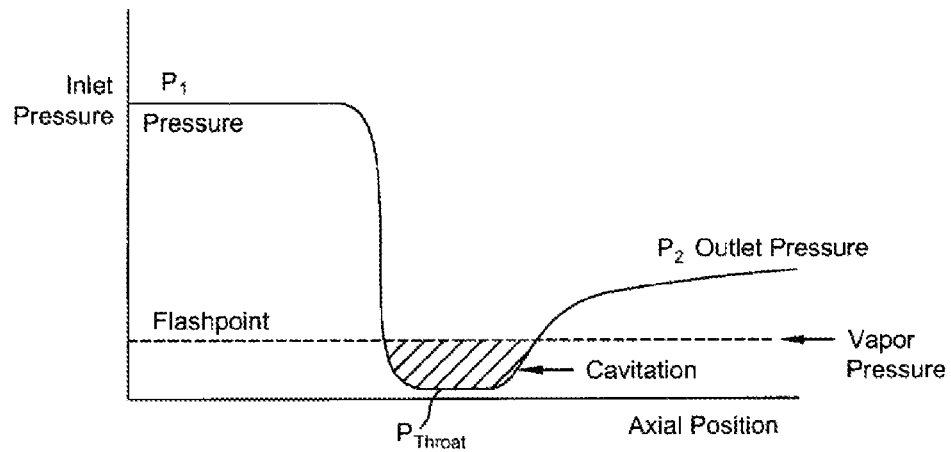
FIG. 2a is a graph illustrating pressure versus axial position along an exemplary single-hole orifice.
Figure 2B:
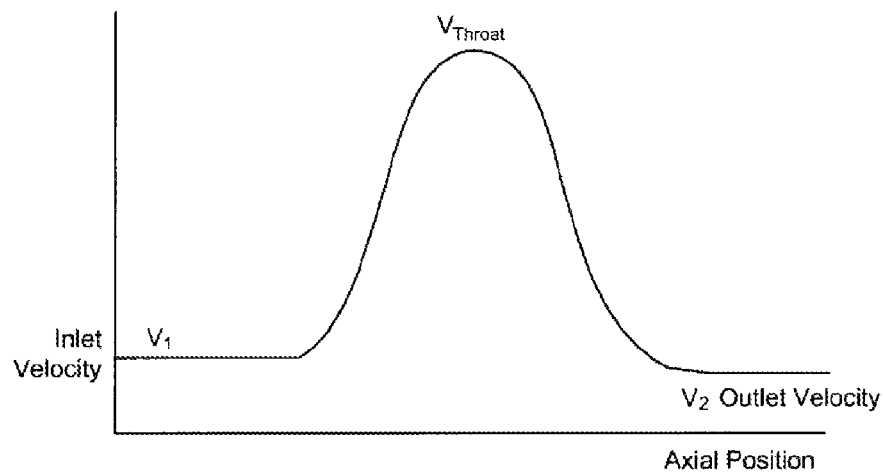
FIG. 2b is a graph illustrating velocity versus axial position along an exemplary single-hole orifice.

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale.

While features of various embodiments are separately described herein, it is understood that such features may be combinable to form other additional embodiments.

Components described herein are manufactured via methods, processes, and techniques understood in the art, including, but not limited to, machining, molding, forming, and three-dimensional printing.

Figure 3:
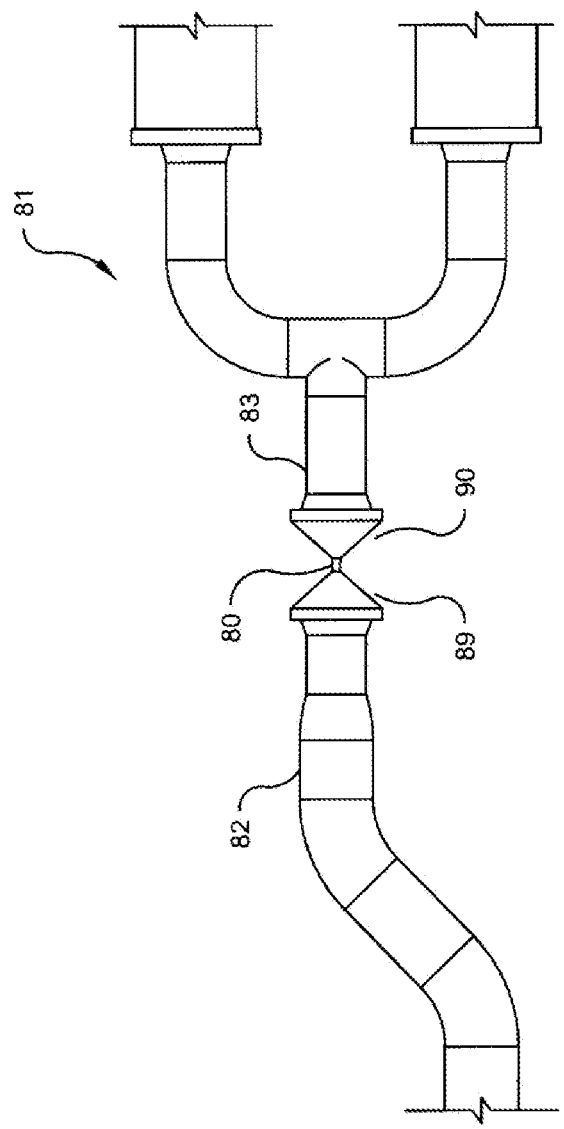
FIG. 3 is a side view of a piping system illustrating location of a flow conditioning device in accordance with an embodiment of the invention.

Referring now to FIG. 3, the invention, referred to as a flow conditioning device 80, is shown in one exemplary application within a piping system 81. The piping system 81 could include an inlet pipe 82 mechanically coupled to a first end of the flow conditioning device 80 and an outlet pipe 83 mechanically coupled to a second end of the flow conditioning device 80. The term pipe is understood to include devices that direct the flow of a fluid, examples including, but not limited to, conduits, pipes and tubes. A fluid is communicated into one end of the flow conditioning device 80 by the inlet pipe 82. The fluid flows axially through the flow conditioning device 80 and is then communicated at a second end to an outlet pipe 83. The inlet pipe 82 could include a reduction section 89 and the outlet pipe 83 could include an expansion section 90 facilitating mechanical coupling when the diameter of the flow conditioning device 80 is less than the diameter of the inlet and outlet pipes 82, 83. However, it is also possible for the flow conditioning device 80 to have a diameter equal to or larger than the inlet and outlet pipes 82, 83 requiring the inlet pipe 82 coupled to an expansion section 90 and the outlet pipe 83 coupled to a reduction section 89. It is likewise possible for the inlet and outlet pipes 82, 83 to have the same outer diameter as the flow conditioning device 80 thereby avoiding reduction and expansion sections 89, 90.

Figure 4:
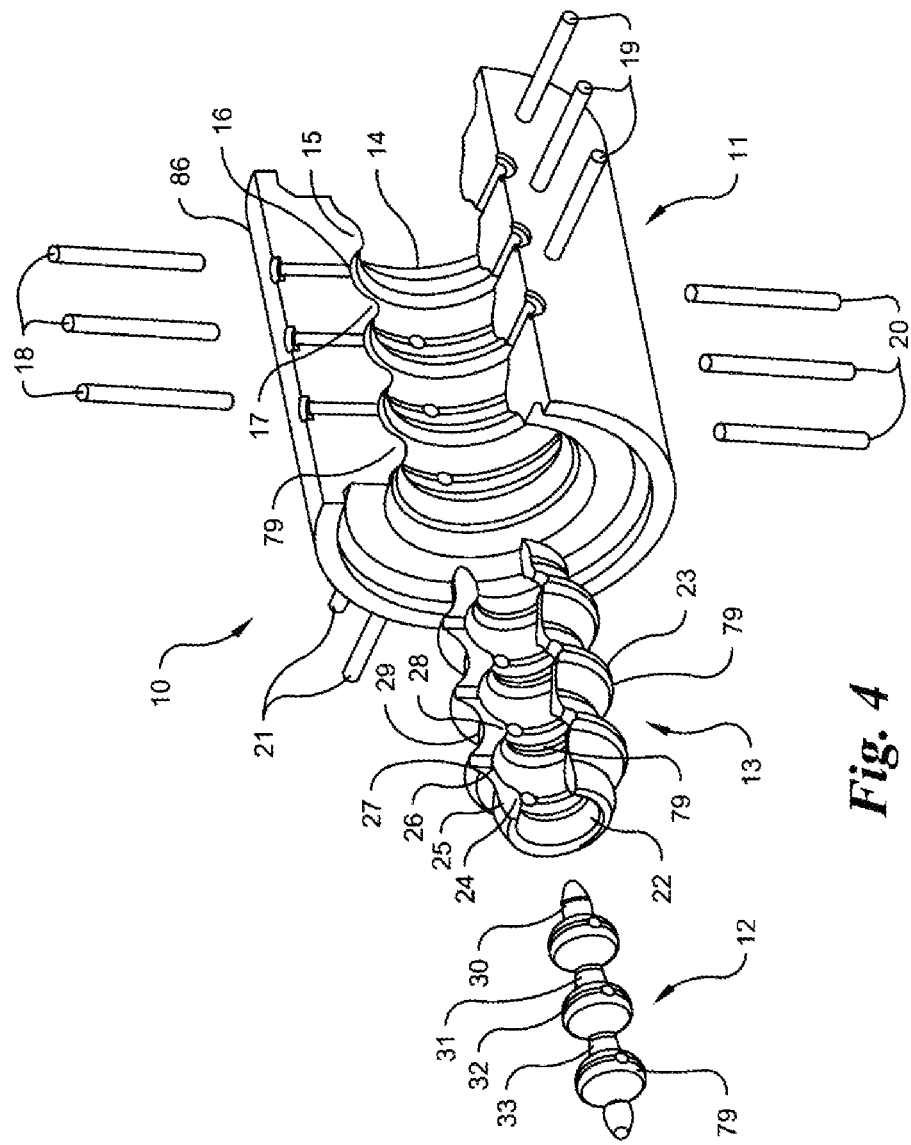
FIG. 4 is an exploded perspective view illustrating center element, intermediate annular element, and outer annular housing in accordance with an embodiment of the invention.

Referring now to FIG. 4, one possible embodiment of the flow conditioning device 10 is shown including an outer annular housing 11, an intermediate annular element 13, and a center element 12. Although one intermediate annular element 13 is illustrated, it is understood that the invention could include one or more intermediate annular element(s) 13.

The outer annular housing 11, intermediate annular element(s) 13, and center element 12 are composed of one or more materials including, but not limited to, metals, plastics, and composites. Material selection is application dependent based on such criteria, by way of example only, as the fluid type, flow rate, pressures, temperatures, and operating environment. For example, high-strength, temperature resistant metal is preferred when the fluid is liquid oxygen and the operating environment includes feed lines to injectors in a rocket engine combustion chamber.

Figure 5:
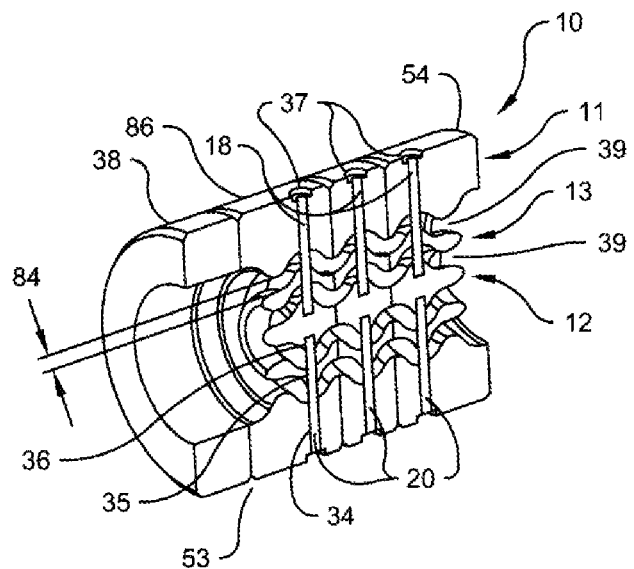
FIG. 5 is a cross-section perspective view illustrating an assembly including center element, intermediate annular element, and outer annular housing in accordance with an embodiment of the invention.

The outer annular housing 11 is an element of generally cylindrical construction with an opening that traverses the axial length thereof. The radial cross section of the outer annular housing 11 is substantially circular. The axial cross section of the outer annular housing 11 is defined by an outer annular surface 86 and an inner annular surface 14. The outer annular surface 86 could include a cylindrical profile; although other designs are possible. The inner annular surface 14 defines the axial profile of the opening. The inner annular surface 14 could include a radial maximum 16 disposed between a pair of radial minimums 15, 17. The radial minimums 15, 17 correspond to a circular opening smaller than the circular opening at the radial maximum 16. The transition between each radial minimum 15, 17 and the radial maximum 16 could be arcuate, curved, or otherwise shaped so that the resultant structure provides a continuously variable or otherwise smooth transition from the radial minimum 15 to the radial maximum 16 and from the radial maximum 16 to the radial minimum 17. The radial minimums 15, 17 and radial maximum 16 could repeat along the length of the inner annular surface 14 to form a wavy structure referred to as an undulated surface 79. In some embodiments, an optional spacer ring 38 could be attached to at least one end of the outer annular housing 11, as shown in FIG. 5. The spacer ring 38 could facilitate assembly of the flow conditioning device 10 within a particular application.

The intermediate annular element(s) 13 is also of cylindrical construction with a substantially circular opening that traverses the length thereof. The axial cross section of each intermediate annular element(s) 13 is defined by the inner annular surface 22 and an outer annular surface 23. The inner annular surface 22 could include a radial maximum 26 disposed between a pair of radial minimums 24, 28. The radial minimums 24, 28 correspond to a circular opening smaller than the circular opening at the radial maximum 26. The transition between the each radial minimum 24, 28 and the radial maximum 26 could be arcuate, curved, or otherwise shaped so that the resultant structure provides a continuously variable or otherwise smooth transition from the radial minimum 24 to the radial maximum 26 and from the radial maximum 26 to the radial minimum 28. The radial minimums 24, 28 and radial maximum 26 could repeat along the length of the inner annular surface 22 forming a wavy structure also referred to as an undulated surface 79. Likewise, the outer annular surface 23 could include a radial maximum 27 disposed between a pair of radial minimums 25, 29. The radial minimums 25, 29 correspond to an outer diameter smaller than the outer diameter at the radial maximum 27. The transition between each radial minimum 25, 29 and the radial maximum 27 could be arcuate, curved, or otherwise shaped so that the resultant structure provides a continuously variable or otherwise smooth transition from the radial minimum 25 to the radial maximum 27 and from the radial maximum 27 to the radial minimum 29. The radial minimums 25, 29 and radial maximum 27 could repeat along the length of the outer annular surface 23 forming a wavy structure also referred to as an undulated surface 79.

The center element 12 is a rod-like or cylinder-like element with a substantially circular cross section. The axial profile of the center element 12 is defined by an outer annular surface 30. The outer annular surface 30 could likewise include a radial maximum 32 disposed between a pair of radial minimums 31, 33. The radial minimums 31, 33 correspond to an outer diameter smaller than the outer diameter at the radial maximum 32. The transition between each radial minimum 31, 33 and the radial maximum 32 could be arcuate, curved, or otherwise shaped so that the resultant structure provides a continuously variable or otherwise smooth transition from the radial minimum 31 to the radial maximum 32 and from the radial maximum 32 to the radial minimum 33. The radial minimums 31, 33 and radial maximum 32 could repeat along the length of the outer annular surface 30 forming a wavy structure also referred to as an undulated surface 79.

Referring now to FIGS. 4 and 5, the intermediate annular element(s) 13 and center element 12 are fixed to the outer annular housing 11, preferably via pins 18-21 or other fasteners. Although four sets of three pins 18-21 are shown, the number and arrangement of pins are design dependent and a function of the pressure loads imposed by the flow over the pins 18-21. In one exemplary embodiment, two pins could be oppositely disposed about the circumference of the flow conditioning device 10 at one or more axial locations. In another exemplary design, three pins could be position about the circumference of the flow conditioning device 10 every 120-degrees at one or more axial locations. In yet another exemplary design, four pins 18-21 could be position about the circumference of the flow conditioning device 10 every 90-degrees at one or more locations, the latter illustrated in FIG. 4.

The outer annular housing 11, intermediate annular element(s) 13, and center element 12 are provided with two or more sets of holes 34, 35, and 36, respectively. Each first hole 34 should completely traverse the thickness of the outer annular housing 11 and allow for a clearance fit. Each second hole 35 should completely traverse the thickness of the intermediate annular element 13 and allow for an interference fit. Each third hole 36 could partially traverse the width of the center element 12 and allow for an interference fit. The holes 34-36 should align when the intermediate annular element(s) 13 and center element 12 are properly positioned within the outer annular housing 11.

The outer annular housing 11, intermediate annular element(s) 13, and center element 12 could be positioned and held in place for assembly purposes by a fixture. A pin 18-21 is inserted into each outermost hole 34. A force is then applied to the end of the pin 18-21 in the direction of the outer annular housing 11 so that the pin 18-21 traverses the hole 35 through the intermediate annular element 13 and then the hole 36 along the center element 12. A weld plug 37 or adhesive may be applied along the outer annular surface 86 above each pin 18-21 to fix the pins 18-21 to the flow conditioning device 10. In other embodiments, a weld or adhesive could be applied to each pin 18-21 at the intersection with the intermediate annular element(s) 13 and center element 12. In the latter embodiments, the interference fit could be optional.

The diameter profiles of the outer annular housing 11, intermediate annular element(s) 13, and center element 12 should permit assembly of the various components so that the intermediate annular element(s) 13 and outer annular housing 11 are disposed about the center element 12 in a concentric arrangement. The diameter and thickness profiles of the intermediate annular element(s) 13 and center element 12 should ensure a gap between the outer annular housing 11 and outermost intermediate annular element 13, and between each pair of immediately adjacent intermediate annular elements 13 (only one shown), and between the innermost intermediate annular element 13 and the center element 12. The gap, referred to herein as an axial flow path 39, should completely traverse the axially length of the flow conditioning device 10 so as to allow a fluid to pass from the inlet end 53 to the outlet end 54, as represented in FIG. 5. The height 84 along each axial flow path 39 could be constant or vary along the axial length of the flow conditioning device 10.

In one aspect of the invention, the number of axial flow paths 39 are determined by the number of intermediate annular elements 13. The number of axial flow paths 39 correlates to one more than the total number of intermediate annular elements 13 within the flow conditioning device 10. For example, one intermediate annular element 13 provides two axial flow paths 39. In another aspect of the invention, the performance of a flow conditioning device 10 is influenced by the total number of axial flow paths 39. As a general rule, resistance to flow increases as the number of axial flow paths 39 is increased. Furthermore, it is preferred that the flow along one axial flow path 39 not enter or mix with the flow along another axial flow path 39.

Figure 6:
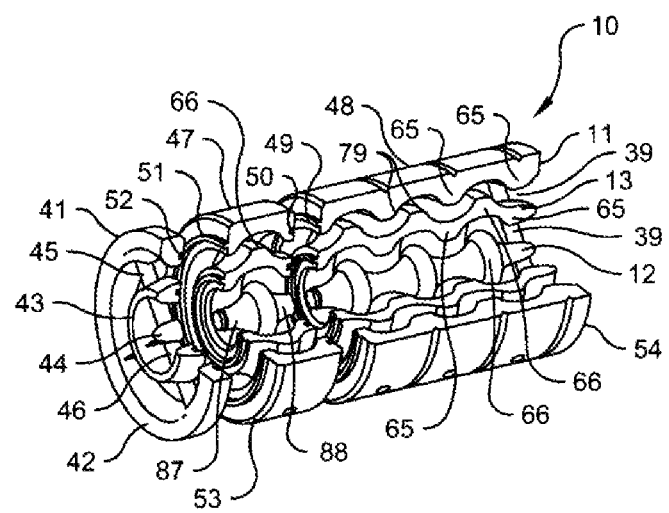
FIG. 6 is a partial-section perspective view illustrating an optional modular form of a flow conditioning device with optional end cap in accordance with an embodiment of the invention.

The undulated surfaces 79 described herein define annular extensions 65, 66 along the axial flow paths 39. The undulated surfaces 79 provide an aerodynamic pathway that minimizes viscous drag and resistance encountered by the axial flow along each axial flow path 39. Referring now to FIGS. 4 and 6, each pair of radial maximums 26, 27 corresponds to an outward annular extension 66, each radial maximum 32 corresponds to an outward annular extension 66, each radial minimum 15, 17 corresponds to an inward annular extension 65, and each pair of radial minimums 24, 25, 28, 29 corresponds to an inward annular extension 65. In preferred embodiments, the inward annular extensions 65 are positioned so as to substantially align and the outward annular extensions 66 are positioned so as to substantially align, as represented in FIG. 6. Each inward annular extension 65 should substantially align with the corresponding radial minimums along the intermediate annular element(s) 13 and center element 12. Each outward annular extension 66 should substantially align with the corresponding radial maximums along the outer annular housing 11 and intermediate annular element(s) 13, as represented in FIG. 6. In some embodiments, the flow may be directed outward and then inward. In other embodiments, the flow may be direct inward and then outward.

Each inward annular extension 65 and each outward radial extension 66 locally controls the direction of flow along an axial flow path 39. The inward annular extensions 65 direct the fluid to locally move radially inward in the direction of the center element 12. The outward annular extensions 66 direct the fluid to locally move radially outward in the direction of the outer annular housing 11. The resistance to flow is determined, in part, by the annular extensions 65, 66. In general, flow resistance increases with an increase in the size and/or number of annular extensions 65, 66. The dimensional properties, namely, width and height, and/or shape of the annular extensions 65, 66 may be the same or vary along the flow conditioning device 10 and/or between surfaces defining the axial flow paths 39.

Referring now to FIG. 6, the flow conditioning device 10 could be constructed from an outer annular housing 11, an intermediate annular element(s) 13, and a center element 12 that include one inward annular extension 65 and one outward annular extension 66. In some embodiments, the annular extensions 65, 66 could be continuous structures. In other embodiments, one annular extension 65 could be divided into two portions 87, 88 whereby a first portion 87 is disposed along one side and a second portion 88 is disposed along another side of another annular extension 66, as illustrated in the module 47. While the inward annular extension 65 is shown in two parts in FIG. 6, it is also possible for the outward annular extension 66 to be divided and disposed about an inward annular extension 65.

The flow conditioning device 10 could be constructed as a unitary element with two or more annular extensions 65, 66 and two or more axial flow paths 39, as represented in FIG. 5. It is likewise possible for the flow conditioning device 10 to be assembled from two or more modules 47, 48, as represented in FIG. 6, facilitating stackable, scalable solutions. For example, if a single module provides a 2-psi pressure drop, then a user could stack five modules 47 in an end-to-end configuration when the required pressure drop is 10-psi. It is also possible for the modules to provide different pressure drops, thus enabling a module with a higher pressure drop to be coupled to a module with a lower pressure drop.

Referring again to FIG. 6, modules 47, 48 could be mechanically coupled and secured to form a flow conditioning device 10. A first module 47 could mechanically interlock with a second module 48 via an annular slot 50 disposed along the vertical face of a first module 47 and an annular tab 49 extending from the vertical face of a second module 48. The interlock could also provide a fluid tight seal between the modules 47, 48. Module 47, 48 could be fixed via a circumferential weld, a mechanical device, examples including, but not limited to, fasteners or a compression band, or adhesively bonded to ensure the structural integrity for a specific application.

Referring again to FIG. 6, the flow conditioning device 10 could include an optional end cap 41 attached to the inlet end 53. The end cap 41 could include an outer ring 42, at least one inner ring 43, and a hub 44. The outer ring 42 and inner ring(s) 43 are concentrically disposed about the hub 44. One or more spokes 45, 46 could extend outward from the hub 44 and secure the outer ring 42 and inner ring(s) 43 thereto. The end cap 41 could be fabricated as a single element or assembled from separate interlocking components.

An outer ring 42 could align with and contact the vertical end of the outer annular housing 11. An inner ring 43 could radially align with and contact the vertical end of each intermediate annular element 13. The hub 44 could align with and contact the vertical end of the center element 12. The vertical end of the outer annular housing 11, intermediate annular element(s) 13, and/or center element 12 could include an annular tab 51 that engages an annular slot 52 disposed along the corresponding element along the end cap 41. The various components comprising the end cap 41 could include features that improve the flow characteristics or aerodynamic properties at the inlet end 53 ensuring separation and channelization of flow into the axial flow paths 39.

Figure 7:
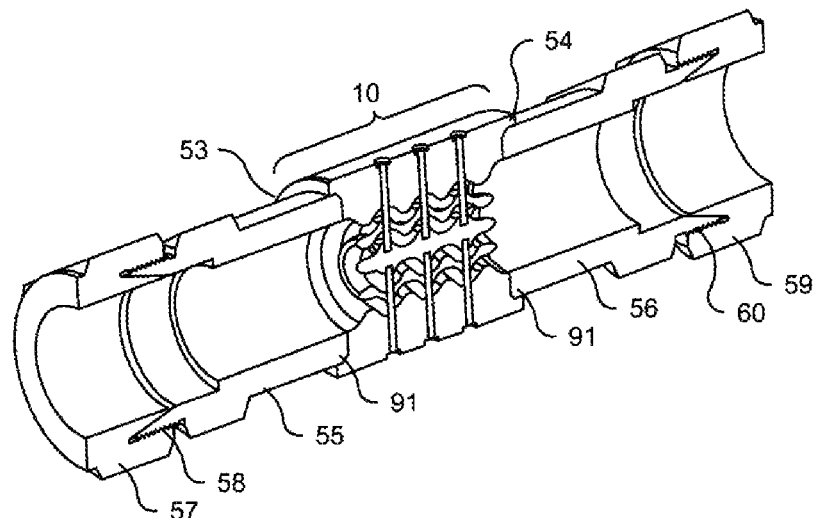
FIG. 7 is a cross-section perspective view illustrating optional spacer elements separately attached to an inlet end and an outlet end of a flow conditioning device allowing mechanical engagement via threads to an inlet pipe and an outlet pipe (pipes not shown), respectively, within a piping system in accordance with an embodiment of the invention.

Referring now to FIG. 7, the flow conditioning device 10 could include a shoulder 91 at each of the inlet and outlet ends 53, 54. A first extension tube 55 could engage the shoulder 91 at the inlet end 53. A second extension tube 56 could engage the shoulder 91 at the outlet end 54. The term tube is understood to include devices that direct the flow of a fluid, examples including, but not limited to, conduits, pipes and tubes. The shoulder 91 could be sized to form an interference fit with each extension tube 55, 56 so as to secure one end of each extension pipe 55, 56 to the flow conditioning device 10. It is likewise possible for the extension tubes 55, 56 to be secured to the flow conditioning device 10 via other means understood in the art. A second end of each extension tube 55, 56 could include threads 58, 60, respectively. The threads 58 along the extension tube 55 could engage complementary threading at the open end of an inlet pipe 57. The threads 60 along the extension tube 56 could engage complementary threading at the open end of an outlet pipe 59.

Figure 8:
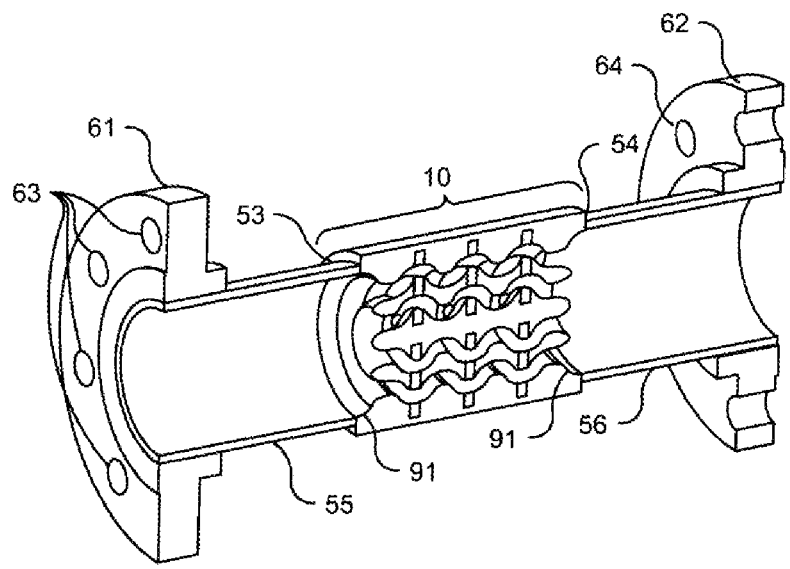
FIG. 8 is a cross-section perspective view illustrating optional spacer elements separately attached to an inlet end and an outlet end of a flow conditioning device allowing mechanical engagement via a flange to an inlet pipe and an outlet pipe (pipes not shown), respectively, within a piping system in accordance with an embodiment of the invention.

Referring now to FIG. 8, the flow conditioning device 10 could include a shoulder 91 at each of the inlet and outlet ends 53, 54. A first extension tube 55 could abut the shoulder 91 at the inlet end 53. A second extension tube 56 could abut the shoulder 91 at the outlet end 54. A circumferential weld could fix each extension tube 55, 56 to the flow conditioning device 10. It is likewise possible for the extension tubes 55, 56 to be secured to the flow conditioning device 10 via other means understood in the art. A second end of each extension tube 55, 56 could include a flange 61, 62, respectively, secured thereto via a circumferential weld. The flange 61 could engage a similar structure (not shown) at the open end of the inlet pipe 57. The flange 62 could likewise engage a similar structure (not shown) at the open end of the outlet pipe 59. Each flange 61, 62 could include holes 63, 64, respectively, allowing mechanical coupling via bolts or other fasteners understood in the art.

The coupling configurations described in FIGS. 7 and 8 are for illustrative purposes only. Therefore, the extension tubes 55, 56 are attachable to inlet and outlet pipes 57, 59 via other means understood in the art. Furthermore, it is possible in other embodiments for the inlet and outlet pipes 57, 59 to be directly coupled to the flow conditioning device 10.

Referring again to FIGS. 3-8, the flow conditioning device 10 receives a fluid from a piping system 81. The fluid is communicated into the inlet end 53 at a first end of the flow conditioning device 10. The fluid traverse the axial length of the flow conditioning device 10 from the inlet end 53 to the outlet end 54, the latter at a second end of the device. The fluid is separated into two or more axial flow paths 39 upon entering the flow conditioning device 10. The axial flow paths 39 are defined by one or more intermediate annular element(s) 13. Each intermediate annular element(s) 13 divides the fluid flow into separate flow streams between an outer annular housing 11 and a center element 12. An end cap 41 could be attached to the flow conditioning device 10 to improve the flow dynamics at the inlet end 53. The fluid flow is locally directed radially outward and inward or radially inward and outward within each axial flow path 39. The process is repeated so as to incrementally reduce the pressure within the fluid. The fluid is locally directed outward by one or more annular extensions 66 oriented in the direction of the outer annular housing 11. The fluid is locally directed inward by one or more inward annular extensions 65 oriented in the direction of the center element 12. In some embodiments, the annular extensions 65, 66 are defined by undulated surfaces 79 that less abruptly alter the local direction of flow. The undulated surfaces 79 are shaped or otherwise formed to minimize viscous drag and resistance encountered by the axial flow along each axial flow path 39. In other embodiments, the annular extensions 65, 66 may be defined by discontinuities that more abruptly alter the local direction of flow. The fluid is then communicated back into the piping system 81. The process of alternately directing fluid flow locally outward and locally inward could be performed by two or more modular units permitting an end-to-end assembly. One annular extension 65, 66 could be divided into a first portion 87 and a second portion 88 separately disposed at the inlet end 53 and the outlet end 54 of a flow conditioning device 10. The pressure of the fluid reentering the piping system 81 is less than the pressure of the fluid received from the piping system 81. Furthermore, the pressure within and exiting the flow conditioning device 80 is above a vapor pressure threshold of the fluid.

Figure 9:
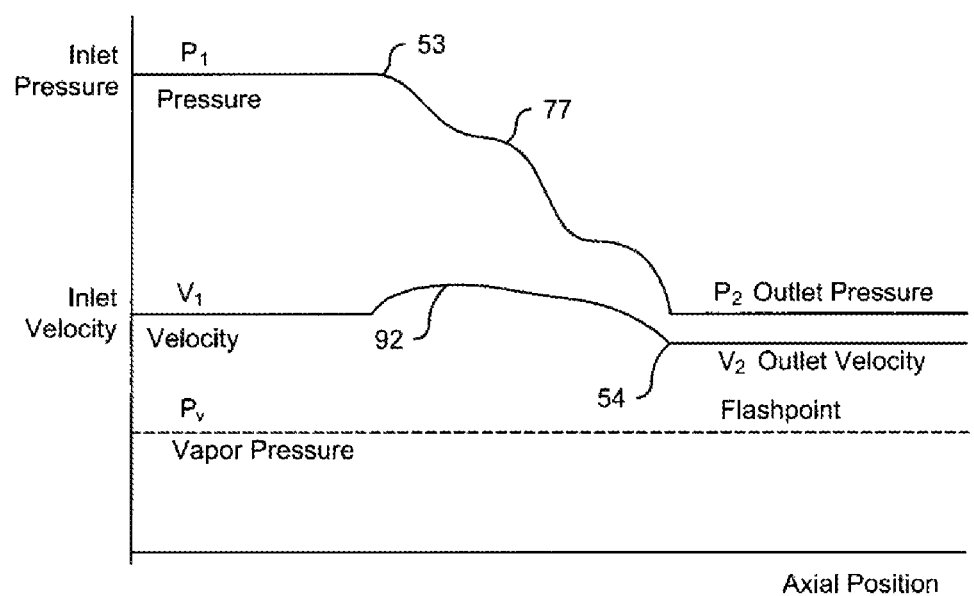
FIG. 9 is a graph illustrating exemplary pressure and velocity versus axial position along a flow conditioning device in accordance with an embodiment of the invention.

Referring now to FIG. 9, the graph illustrates exemplary pressure and velocity profiles for a fluid as it traverses an exemplary embodiment of the invention. The fluid enters the flow conditioning device 10 at the inlet end 53 with a pressure $P_1$ and a velocity $V_1$. Next, the fluid passes along and interacts with the annular extensions 65, 66 resulting in a decrease 77 in pressure and an increase 92 in velocity. Both pressure and velocity decrease with each successive interaction after the first interaction, although at different rates. This process is repeated for each successive pair of annular extensions 65, 66, to incrementally decrease the pressure within the fluid. The pressure within the flow conditioning device 10 is greater than the vapor pressure $P_v$. The fluid then exits the flow conditioning device 10 at the outlet end 54 with a pressure $P_2$ and a velocity $V_2$. The pressure $P_2$ at the outlet end 54 is less than the pressure $P_1$ at the inlet end 53, yet greater than the vapor pressure $P_v$. The velocity $V_2$ at the outlet end 54 is approximately equal to the velocity $V_1$ at the inlet end 53, although in many cases a small velocity drop is possible. The flow conditioning device 10 is designed so that pressure and velocity conditions within the flow conditioning device 10 and at the outlet end 54 avoid the instabilities described herein.

Figure 10:
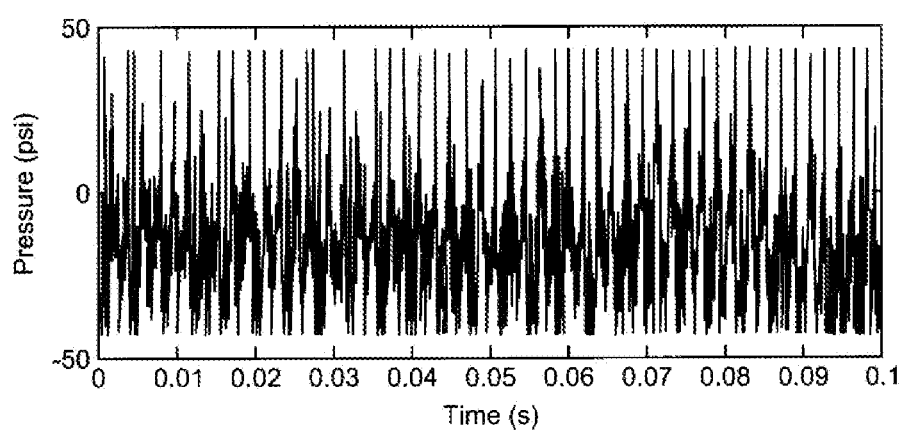
FIG. 10 is a graph illustrating pressure versus time data downstream from an exemplary single-hole orifice.

Referring now to FIG. 10, an exemplary pressure versus time plot is shown for a fluid after exiting an exemplary single-hole orifice. The pressure oscillates rapidly and widely between negative and positive valves. This behavior is representative of the instabilities described herein.

Figure 11:
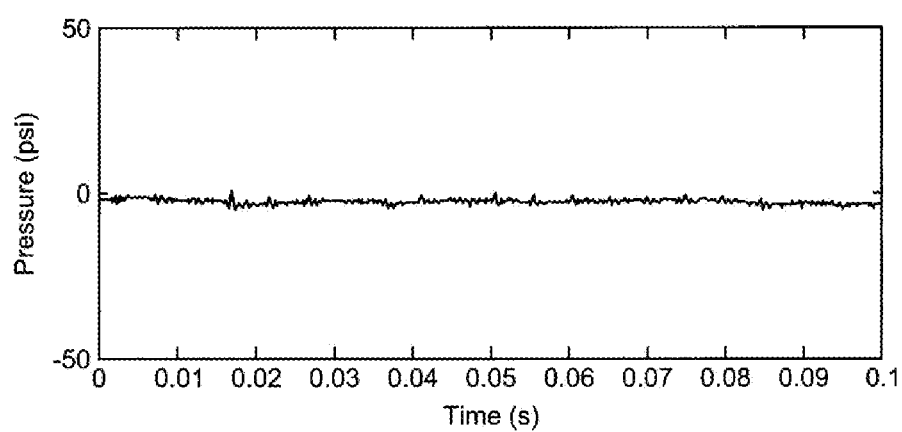
FIG. 11 is a graph illustrating pressure versus time data downstream from a flow conditioning device in accordance with an embodiment of the invention.

Referring now to FIG. 11, an exemplary pressure versus time plot is shown for a fluid after exiting an exemplary embodiment of the invention. The pressure is substantially uniform over time within minor positive and negative excursions. This behavior is representative of instability-free fluid flow.

As is evident from the explanation herein, the described invention is a flow conditioning device which facilitates pressure reduction within a system that moves fluid within a controlled fashion. The invention is applicable to a variety of flow regimes, exemplary applications including, but not limited to, piping systems for conventional liquids, cryogenic liquids, and volatile liquids. Accordingly, the described invention is expected to be used, by way of example only, in propellant lines to regulate flow rate, propellant condition systems, propellant feed systems, coolant systems for rocket test stands and launch pads, coolant systems for power generating equipment, refineries, and pharmaceutical manufacturing equipment.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A flow conditioning device for stepping down a pressure within an axial flow within a piping system while minimizing pressure fluctuations, vortex formation, and cavitation comprising:
   (a) an outer annular housing including an inlet end attachable to an inlet pipe and an outlet end attachable to an outlet pipe;
   (b) a center element; and
   (c) at least one intermediate annular element, said outer annular housing and said intermediate annular element(s) concentrically disposed about said center element, said center element and said intermediate annular element(s) fixed to said outer annular housing so as to be completely non-movable therein, said intermediate annular element(s) separates said axial flow within said outer annular housing into at least two axial flow paths, each said axial flow path has an annular cross section; wherein each said axial flow path includes at least two annular extensions that alternately direct said axial flow radially outward and inward or radially inward and outward thereby reducing said pressure as said axial flow traverses said axial flow paths so that said pressure at said outlet end is lower than said pressure at said inlet end, said pressure within said axial flow along said axial flow paths is greater than a vapor pressure for said axial flow.

2. The flow conditioning device of claim 1, wherein each said axial flow path is defined by an inner annular surface and an outer annular surface, each said inner annular surface includes at least one said annular extension directed toward said center element, each said outer annular surface includes at least one said annular extension directed toward said outer annular housing, said annular extensions arranged so that one said annular extension disposed outward is immediately adjacent to another said annular extension disposed inward.

3. The flow conditioning device of claim 2, wherein said annular extensions are defined by an undulated surface along each of said inner annular surface and said outer annular surface, said undulated surfaces minimize viscous drag and resistance encountered by said axial flow along each said axial flow path.

4. The flow conditioning device of claim 1, wherein height of said axial flow path is constant along length of said axial flow path.

5. The flow conditioning device of claim 1, wherein height of said axial flow path varies along length of said axial flow path.

6. The flow conditioning device of claim 1, wherein a pair of extension tubes are separately attached to said inlet end and said outlet end, each said extension tube includes threads facilitating attachment to one of said inlet pipe and said outlet pipe.

7. The flow conditioning device of claim 1, wherein a pair of extension tubes are separately attached to said inlet end and said outlet end, each said extension tube includes a flange facilitating attachment to one of said inlet pipe and said outlet pipe.

8. The flow conditioning device of claim 1, further comprising:

(d) an end cap attached to said inlet end, said end cap includes an outer ring that contacts said outer annular housing, at least one inner ring that separately contacts said intermediate annular element(s), and a hub that contacts said center element, said end cap directs said axial flow into said axial flow paths.

9. The flow conditioning device of claim 1, wherein a first portion and a second portion of said annular extension are disposed about at least one other said annular extension.

10. The flow conditioning device of claim 1, wherein said flow condition device defines a module, at least two said modules attached in an end-to-end arrangement.

11. The flow conditioning device of claim 1, wherein a pin contacts and fixes said intermediate annular element(s) and said center element to said outer annular housing.

12. The flow conditioning device of claim 1, wherein an end cap contacts and fixes said intermediate annular element(s) and said center element to said outer annular housing.

13. A method for stepping down a pressure within an axial flow via a flow conditioning device within a piping system while minimizing pressure fluctuations, vortex formation, and cavitation comprising the steps of:
  (a) receiving an axial flow from said piping system into said flow conditioning device including an outer annular housing with a center element therein;
  (b) separating said axial flow into at least two axial flow paths via at least one intermediate annular element disposed between said outer annular housing and said center element, said center element and said intermediate annular element(s) fixed to said outer annular housing so as to be completely non-movable therein;
  (c) directing said axial flow radially outward and inward or radially inward and outward within each said axial flow path so as to reduce said pressure as said axial flow traverses said flow conditioning device; and
  (d) communicating said axial flow from said flow conditioning device into said piping system after said directing step, said pressure within said axial flow after said directing step lower than said pressure before said directing step, said pressure within said axial flow during and after said directing step greater than a vapor pressure for said axial flow.

14. The method of claim 13, wherein said directing step is implemented by at least two annular extensions along each said axial flow path.

15. The method of claim 14, wherein said annular extensions are defined by an undulated surface, each said undulated surface minimizes viscous drag and resistance encountered by said axial flow along each said axial flow path.

16. The method of claim 14, wherein a first portion and a second portion of said annular extension are disposed about at least one other said annular extension.

17. The method of claim 13, wherein said separating step is further implemented by an end cap, said end cap includes an outer ring that contacts said outer annular housing, at least one said inner ring that separately contacts said intermediate annular element(s), and a hub that contacts said center element.

18. The method of claim 13, wherein said directing step is implemented via at least two modules attached in an end-to-end configuration, at least one said module directs said axial flow radially outward and inward or at least one said module directs said axial flow radially inward and outward.

19. The method of claim 18, wherein said pressure at said inlet end and said pressure at said outlet end of one said module define a pressure drop for said module, said pressure drops are identical between two adjacent said modules.

20. The method of claim 18, wherein said pressure at said inlet end and said pressure at said outlet end of one said module define a pressure drop for said module, said pressure drops differ between two adjacent said modules.

21. The method of claim 13, wherein a pin contacts and fixes said intermediate annular element(s) and said center element to said outer annular housing.

22. The method of claim 13, wherein an end cap contacts and fixes said intermediate annular element(s) and said center element to said outer annular housing.

* * * * *